United States Patent
Sullivan et al.

(10) Patent No.: US 7,933,951 B2
(45) Date of Patent: Apr. 26, 2011

(54) SYSTEMS AND METHODS FOR DISCERNING AND CONTROLLING COMMUNICATION TRAFFIC

(75) Inventors: Michael Sullivan, Herndon, VA (US); Alan Sullivan, Leesburg, VA (US)

(73) Assignee: Paxfire, Inc., Herndon, VA (US)

( * ) Notice: Subject to any disclaimer, the term of this patent is extended or adjusted under 35 U.S.C. 154(b) by 88 days.

(21) Appl. No.: 12/161,093

(22) PCT Filed: Jan. 19, 2007

(86) PCT No.: PCT/US2007/001523
§ 371 (c)(1),
(2), (4) Date: Jul. 16, 2008

(87) PCT Pub. No.: WO2007/084713
PCT Pub. Date: Jul. 26, 2007

(65) Prior Publication Data
US 2009/0013089 A1 Jan. 8, 2009

Related U.S. Application Data

(60) Provisional application No. 60/760,366, filed on Jan. 20, 2006.

(51) Int. Cl.
*G06F 15/16* (2006.01)
(52) U.S. Cl. ........ 709/203; 709/201; 709/224; 709/227; 709/229
(58) Field of Classification Search .................. 709/224, 709/230, 226, 227, 229, 201, 203
See application file for complete search history.

(56) References Cited

U.S. PATENT DOCUMENTS

| | | | |
|---|---|---|---|
| 5,794,210 A | 8/1998 | Goldhaber et al. | |
| 5,974,451 A | 10/1999 | Simmons | |
| 6,006,197 A | 12/1999 | D'Eon | |
| 6,009,459 A | 12/1999 | Belfiore et al. | |
| 6,070,185 A | 5/2000 | Anupam et al. | |
| 6,092,100 A | 7/2000 | Berstis et al. | |
| 6,134,680 A | 10/2000 | Yeomans | |
| 6,202,087 B1 * | 3/2001 | Gadish | 709/206 |
| 6,332,158 B1 | 12/2001 | Risley et al. | |
| 6,339,761 B1 | 1/2002 | Cottingham | |
| 6,526,450 B1 | 2/2003 | Zhang et al. | |
| 6,564,243 B1 | 5/2003 | Yedida et al. | |
| 6,594,697 B1 | 7/2003 | Praitis et al. | |
| 6,615,237 B1 | 9/2003 | Kyne et al. | |
| 6,760,746 B1 | 7/2004 | Schneider | |
| 6,968,313 B1 | 11/2005 | Oran | |
| 7,010,537 B2 | 3/2006 | Eyal et al. | |
| 7,010,568 B1 | 3/2006 | Schneider et al. | |
| 7,016,958 B1 | 3/2006 | Aviani | |
| 7,110,399 B2 | 9/2006 | Banerjee et al. | |
| 7,120,833 B2 * | 10/2006 | Kinderman et al. | 714/43 |
| 7,246,133 B2 | 7/2007 | Velasco et al. | |

(Continued)

*Primary Examiner* — Djenane M Bayard
(74) *Attorney, Agent, or Firm* — Greenblum & Bernstein, PLC

(57) ABSTRACT

Communication traffic redirection systems and methods are disclosed that allow for redirection of communication traffic over the Internet based, at least in part, on the type of higher-level communication protocol intended to be used. The systems and methods permit redirection of only certain types of communication traffic of interest for example HTTP traffic, while permitting other types of communication, for example SMTP traffic, to pass without redirection. The systems and method can employ a training and dynamic feedback procedure to ensure only traffic of interest is redirected. The systems and methods provide efficient redirection of specific types of traffic to redirect landing pages, and allow for efficient methods of generating revenue through advertising.

21 Claims, 1 Drawing Sheet

U.S. PATENT DOCUMENTS

| | | | |
|---|---|---|---|
| 7,631,101 B2 * | 12/2009 | Sullivan et al. | 709/245 |
| 2002/0009079 A1 | 1/2002 | Jungck et al. | |
| 2002/0013844 A1 | 1/2002 | Garrett et al. | |
| 2002/0032766 A1 | 3/2002 | Xu | |
| 2002/0055848 A1 | 5/2002 | Jae et al. | |
| 2002/0065842 A1 | 5/2002 | Takagi et al. | |
| 2002/0165972 A1 | 11/2002 | Chien et al. | |
| 2003/0014539 A1 | 1/2003 | Reznick | |
| 2003/0014759 A1 | 1/2003 | Van Stam | |
| 2003/0018726 A1 | 1/2003 | Low et al. | |
| 2003/0110161 A1 | 6/2003 | Schneider | |
| 2003/0135548 A1 | 7/2003 | Bushkin | |
| 2003/0149787 A1 | 8/2003 | Mangan | |
| 2003/0231754 A1 | 12/2003 | Stein et al. | |
| 2003/0233328 A1 | 12/2003 | Scott et al. | |
| 2003/0236729 A1 | 12/2003 | Epstein et al. | |
| 2004/0030780 A1 | 2/2004 | Walters | |
| 2004/0044566 A1 | 3/2004 | Bostelmann et al. | |
| 2004/0083283 A1 | 4/2004 | Sundarem et al. | |
| 2004/0225518 A1 * | 11/2004 | Bain | 705/1 |
| 2005/0015512 A1 | 1/2005 | Kale et al. | |
| 2005/0065806 A1 | 3/2005 | Harik | |
| 2005/0105513 A1 | 5/2005 | Sullivan et al. | |
| 2005/0135264 A1 | 6/2005 | Popoff et al. | |
| 2005/0198068 A1 | 9/2005 | Mukherjee et al. | |
| 2005/0235044 A1 | 10/2005 | Tazuma | |
| 2006/0218242 A1 | 9/2006 | Tock et al. | |

* cited by examiner

SYSTEMS AND METHODS FOR DISCERNING AND CONTROLLING COMMUNICATION TRAFFIC

CROSS-REFERENCE TO RELATED APPLICATIONS

This application is a U.S. National Stage application of PCT/US2007/001523, filed 19 Jan. 2007, which relies on the disclosure of and claims the benefit of the filing date of U.S. provisional patent application No. 60/760,366, filed 20 Jan. 2006, the entire disclosures of both of which are hereby incorporated herein in their entireties by reference.

BACKGROUND OF THE INVENTION

1. Field of the Invention

The present invention relates generally to identifying various types of communication traffic and controlling movement of that traffic within a communications network. More specifically, the present invention relates to systems and methods for identifying protocols associated or intended to be associated with a particular communication, and providing services, such as redirection services, based on the type of protocol. The systems and methods rely, in part, on the ability to identify or predict particular protocols based on hostnames, and to redirect certain communications, but not others, based on the protocol associated with the communication.

2. Background of the Invention

One power of the Internet is the ability to connect two computers in geographically distant areas. Often, a computer user knows the precise IP Address of a computer with which he would like to connect. In such a situation, the user will submit the IP Address to the Internet infrastructure, and be connected directly to the desired computer.

Typically however, computer users do not know the actual IP Address of the computer they wish to contact. Rather, they know the name, in a human language, of the web page or e-mail address they wish to contact. In such a situation, they cannot connect directly to the computer of interest, but must rely on the network or Internet infrastructure to provide them the correct IP Address and make a connection to the target computer using a search and connect strategy. In general under such circumstances, information is transmitted through computer systems, such as networks and the Internet, from one user to another by way of a series of designated transfer point computers referred to as servers. The key server type in transmittal of information through networks is the domain name system server, or DNS server (used as an abbreviation for both the singular and plural). There are two main types of DNS servers: authoritative DNS and caching/recursive DNS. Authoritative DNS servers contain, among other things, a mapping of host names (typically human recognizable character strings) and Internet Protocol (IP) Addresses within their own particular domains. They supply a specific IP Address of a computer in their domain upon request from another computer (its client) in order to enable one computer to contact another. In contrast, caching/recursive DNS servers do not initially know IP Addresses of specific users' computers. Rather, caching/recursive DNS servers know how to find Authoritative DNS servers that have the name to IP Address mapping data. When a caching/recursive DNS server receives a request for an IP Address from a client, it contacts Authoritative DNS servers to identify the specific Authoritative DNS that knows the particular IP Address of interest to its client. Upon identifying proper authoritative DNS server, the caching/recursive DNS server contacts one or more of those, and obtains the IP Address of interest. The caching/recursive DNS server then returns the IP Address to its client so that a connection between the client and the computer at that IP Address can be made.

In a common scenario, the user types into the Internet browser resident on his personal computer a particular web site of interest in the form of a Uniform Resource Locator (URL; e.g., hypertext transfer protocol-colon-double slash-www-dot-paxfire-dot-com). The browser on the user's computer sends a request to a caching/recursive DNS server (typically a DNS owned and/or operated by his ISP; also referred to herein simply as a DNS server) to convert the host/domain name to an IP Address for it. The caching/recursive DNS server, if it knows this information from a previous lookup (hence the term "caching" is used), will supply it to the user's browser, and a connection between the two computers is made. If it does not know this information, it makes a request to an Authoritative DNS server to begin the process of querying authoritative servers for the IP Address information. Typically, the first Authoritative DNS queried is at the root level (also referred to as a "root DNS") to begin the process of locating the Authoritative DNS server for the requested hostname/domain name. The root DNS servers contain a list (mapping) of which top-level domains exist, and the IP Addresses of the Authoritative DNS servers for each domain (example: .com). Once the caching/recursive server knows the IP Address of the top-level domain server, it contacts it directly to query about the hostname/domain name that it is looking for. The top-level domain server will respond to the query with a pointer to the second-level DNS servers that are authoritative for that domain, if it exists. The caching/recursive DNS server then queries the second-level DNS server that is authoritative for that domain for the IP Address of the hostname/domain name it is looking for, and if it exists, the server will respond with one or more valid IP Addresses to the request. If at any time an Authoritative server in the resolution path determines that the requested hostname/domain name does not exist, that Authoritative DNS informs the caching/recursive DNS server that the requested information does not exist, and this result is typically passed back to the user's browser. If the requested IP Address exists for the hostname/domain name, the caching DNS server then passes the IP Address down to the user's browser, and a connection is made between the two computers.

Use of IP Addresses as the common mode of identification of the various computers on the Internet provides a basic communication system upon which multiple different types of communication protocols can be layered. For example, communication protocols such as TCP, UDP, HTTP, HTTPS, and FTP can be used to specify transfer of certain information from one computer to another, where those computers are linked to each other based on their respective IP Addresses. Because the Internet IP routing infrastructure deals only with IP Addresses, the main function of a DNS server is to translate a hostname into an IP Address. One result of the layering effect and the function of DNS servers is that a DNS server does not know the type of higher-layer protocol used in any particular communication. Rather, it merely searches for a hostname within the communication it receives, and converts the hostname into an IP Address.

For example, if a user were to type in hypertext transfer protocol-colon-double slash-www-dot-paxfire-dot-com-slash-index-dot-html), the DNS server would receive only the hostname part of the URL: www.paxfire.com. Its job is to turn that hostname into a valid IP Address, and provide that IP Address to the requesting computer. Once that IP Address were known, the requesting computer would initiate a TCP connection and use the HTTP protocol in that connection with the Paxfire computer at the IP Address supplied, and request the file index.html. Likewise, if a user were to type in file transfer protocol-colon-double slash-www-dot-paxfire-dot-com-slash-index-dot-html, the DNS server would still only receive the hostname www.paxfire.com and attempt to obtain a valid IP Address, and provide that IP Address to the requesting computer. Once that IP Address were known, the requesting computer would initiate an FTP connection with the Paxfire computer at the IP Address supplied, and request the file index.html.

While the IP Address protocol system of the Internet provides a uniform protocol for connecting computers on the Internet, because DNS servers only receive hostnames to translate into IP Addresses, they cannot segregate communication requests based on the identity of higher-level protocols desired. Thus, the common implementation of DNS does not provide the ability to control traffic based on type of higher-level protocol being used. This shortcoming results in miscommunications and lost time, effort, and money.

Thus, there exists a need in the art for systems and methods for identifying, determining, or predicting the type of higher-level protocol being used in a particular Internet communication, and using this information to control communication traffic.

SUMMARY OF THE INVENTION

The present invention provides systems and methods that identity or predict communication protocols associated with Internet communications, and control the movement of those Internet communications based on the particular protocol associated with each communication. The systems and methods can be implemented at any point in a communication pathway, but are preferably implemented, at least in part, at one or more points between an Internet user (whether that user be a person or machine) and a DNS server, or on a DNS server. The systems and methods can be used for any suitable purpose, including, but not limited to, providing efficient and effective communication traffic control services, such as redirection of Internet communications based on pre-defined bit strings.

Integrated systems implementing the methods of the invention are referred to herein at points as an Internet appliance, and unless otherwise specified such a term should be interpreted as referring to the systems, methods, or both, of the invention. The term Internet appliance should not be understood to be limited to uses over the Internet, per se, but should be understood to include all communications over communication systems, including, but not limited to, telephony.

Furthermore, the terms "user", "computer", and "subscriber" are used to identify three general tiers or levels of interaction within the systems of the invention. As used herein, a user is a particular person using a communication device, such as a computer or telephone. A computer according to the invention is any device that can be used by a user to communicate over a network. For example, a computer can be a personal computer, which may serve multiple users within one office or home. Likewise, a computer may be a telephone, which also may serve multiple users within one office or home. As used herein, a subscriber is a communication device that interacts with and/or controls traffic within one or more communications networks. For example, a subscriber may be a router that connects one or more computers to a network, such as one managed by an ISP. Unless otherwise defined below for a particular purpose, these general definitions are to be applied.

In one aspect, the invention provides an Internet appliance for monitoring and controlling communication traffic. Monitoring of communication traffic can occur in any network, including but not limited to, a computer network (e.g., the Internet) and a telephone network. For ease of description, the present invention is described predominantly with regard to computer networks, and in particular with regard to the Internet. However, it is to be understood that each reference to a particular computer system for use in Internet communications can have a corresponding system in other communication areas, including, but not necessarily limited to telephony. Thus, references to Internet systems are to be understood to be expansive, and to include the corresponding systems, devices, communication routes, etc: of other communication areas.

At its basic level, the Internet appliance provides an automated system and method for monitoring communication traffic between a computer and other computers on the Internet. In general, the Internet appliance determines or predicts the higher-level communication protocol that the computer (typically via the user) wishes to use for a particular communication, and controls the communication between the user and the Internet based on the type of protocol to be used. Using various rules and databases, the systems and methods of the invention permit those implementing the Internet appliance of the invention to screen for certain types of higher-level protocols associated with communication traffic, and either modify the communication traffic (for example, by redirecting it) or permit the traffic to pass unmodified. In embodiments, it can also look at the size of a DNS query (total length and/or number of labels) as well as the frequency of a single hostname or domain name to determine whether to redirect the query or not. The size (total length) of the query may indicate that an automated program constructed the query, and thus it might not be desirable to redirect the query. One advantage provided by embodiments of the invention is the ability to redirect only certain types of Internet traffic, based on pre-defined characteristics of the traffic.

In another aspect, the invention provides an Internet appliance for conducting business over a communications system or network. Accordingly, the invention provides a method of conducting business using computers. The systems and methods include monitoring communications between a user or computer at a point of origin and at least one other computer on the Internet, controlling at least some of those communications by redirecting them to sites other than originally requested by the user or computer at the point of origin, and generating revenue by that redirection. Typically, revenue is generated through sale of advertising, which is provided to the user or computer when a communication is redirected, although it can be generated simply through fees charged for providing the service.

DETAILED DESCRIPTION OF VARIOUS EMBODIMENTS OF THE INVENTION

Figure 1:
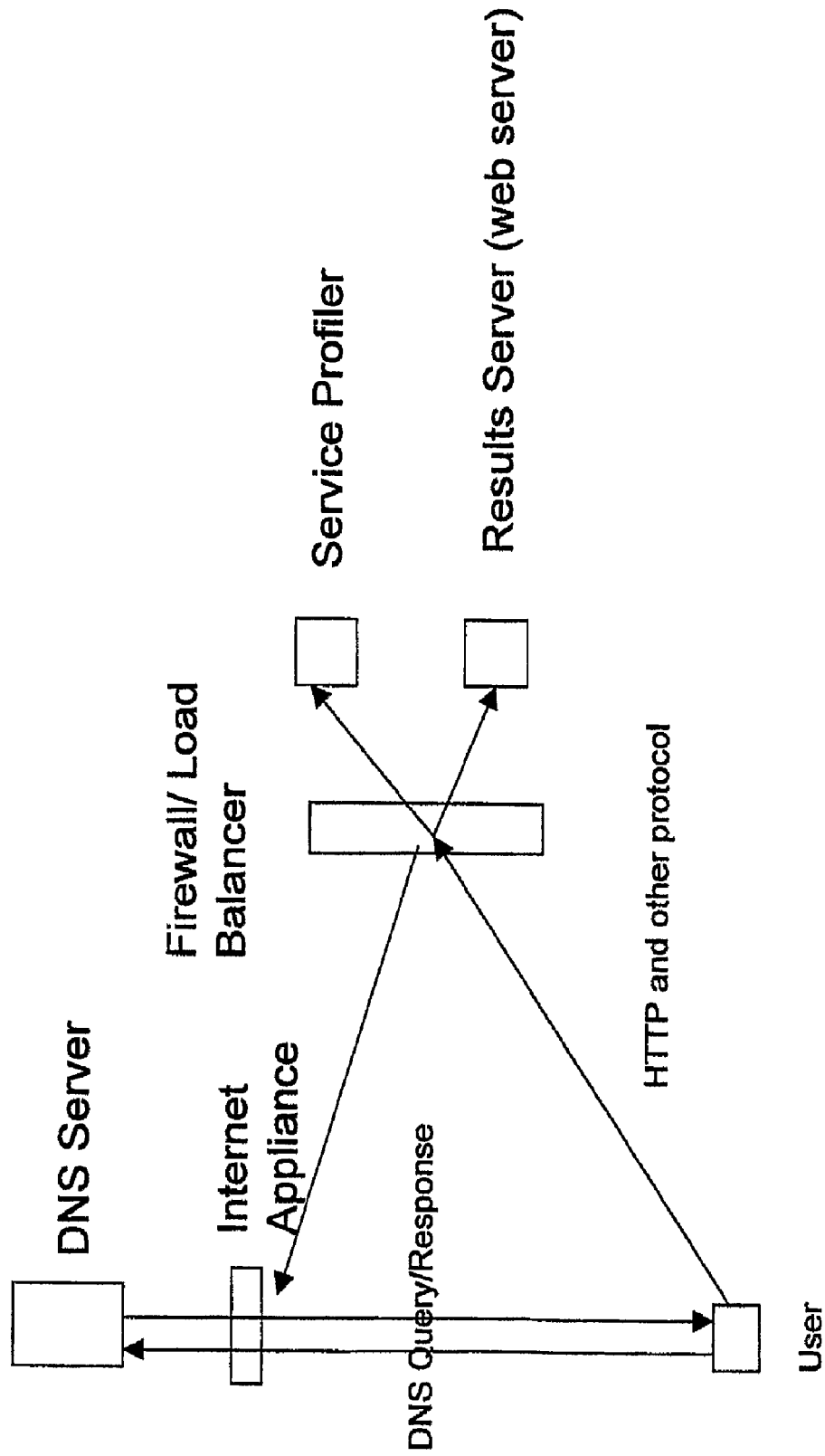
FIG. 1 is a block diagram showing one embodiment of the methods and systems of the invention, in which only certain HTTP protocol traffic is redirected.

Reference will now be made in detail to various exemplary embodiments of the invention, an example of which is illustrated in the accompanying drawing. The following detailed description describes certain embodiments of the invention, and should not be considered as limiting the invention to those embodiments.

The Internet provides a user a quick and accurate direction to a particular web site or web page if the user knows the exact web site or web page address, either through its IP Address or through its hostname/domain name. It is now exceedingly rare for a user to know the actual IP Address of a web site or web page of interest. Instead, the vast majority of Internet users initiate communication sessions by way of hostnames entered into the Internet browser residing on the user's computer. A significant number of the total attempted communication sessions initially fail due to errors in entering the hostname into the browser. These failures are returned by the Internet infrastructure as unresolvable, and are typically handled by simple notification of the user that an error occurred or by redirection of the user to a landing page at an IP Address supplied by the users browser or by an external system capable of supplying an IP Address for redirection (e.g., an Internet appliance according to U.S. Patent Application Publication No. 2005/0105513 or published international application PCT/US2005/015381; the entire disclosures of both of which are incorporated herein by reference). In general, when a user is redirected to a landing page, the page includes information that might or might not be relevant to the user's query (or intended query), along with one or more advertisements, which might or might not be relevant to the query (or intended query).

Redirecting a user who submitted an unresolvable query to a landing page that provides content-relevant information can be preferable to merely providing an error notice or providing a landing page with content-irrelevant information. Systems for providing content-relevant information, such as those provided by Paxfire, Inc. (Herndon, Va., USA), are known and can be quite effective at identifying appropriate traffic for redirection. However, some systems do not discern between different types of protocol traffic (e.g., HTTP traffic, FTP traffic, SMTP traffic), and thus redirect all queries that return an error from the Internet infrastructure. Depending on the hosts for the redirection services (e.g., ISP) and/or the advertisers or advertising content providers supplying ads for the redirection landing page, certain types of traffic are unwanted for redirection. For example, Internet users attempting to use the FTP protocol to transfer a file from a computer on the Internet to their own computer (or vice versa) are typically not using the Internet to obtain information that relates to purchases of goods or services. Typically, programs that use non-HTTP protocols such as FTP are "command line" based and don't have the capability to display advertising content in their application, nor do end users expect this type of behavior from non-HTTP applications. In the same way, companies or individuals providing redirection services (e.g., a "secondary service provider") would prefer not to tie up resources in processing such non-HTTP requests in response to malformed queries.

The present invention provides a system and method for identifying unwanted or undesirable traffic for redirection, by determining the higher-level protocol that may be used during IP communications based on the contents of a DNS response message. Using the present system and method, ISPs, secondary service providers, advertising content providers, advertisers, and other entities employing the system and method can screen traffic prior to redirecting queries to a landing page, and eliminate unwanted traffic based on the commonly used hostname naming conventions and redirected feedback, thus providing redirect landing pages for only those queries that are associated with the appropriate higher-level protocol(s). For example, the system and method can analyze queries and/or responses from the Internet infrastructure for communications associated with the HTTP protocol, and redirect only those queries or responses to a redirect landing page with content-relevant information, allowing all traffic associated with other protocols (e.g., SMTP, FTP) to pass between the user to the Internet unmodified (or redirected to a landing page containing different information than that which would be provided for HTTP traffic). The system and method of the present invention reduce the number of inappropriate redirects. It thus reduces the amount of resources used by entities providing redirection services and reduces the amount of unnecessary traffic in the Internet. Thus, employing the system and method of the present invention not only reduces costs incurred by those providing redirection services and those providing network services, but improves the service provided to Internet users. It improves the use of resources by entities involved in providing redirection services and content, and thus allows for increased revenues or lower expenses for these entities.

The present invention offers a solution to inefficiencies associated with redirection of queries by users or responses to queries returned by the Internet infrastructure, and doing business through computers and the Internet. The solution includes an Internet appliance for monitoring, analyzing, and/or controlling communication traffic, and for providing information, including information useful for conducting business, to redirect operators based on the type of higher-level protocol being used, or intended to be used, in a communication. The system and method according to the present invention are suitable for use in any computer-driven communications system, such as Internet systems. In preferred embodiments, they are implemented, at least in part, at the ISP level of the Internet architecture, and particularly between the user (or a user's computer) and the ISP DNS server.

In a first aspect, the invention provides a system and method for monitoring, analyzing, and/or redirecting communication traffic. In embodiments, the invention relates to Internet communication traffic. The system and method are implemented, at least in part, by way of an Internet appliance that sits at the ISP level of the Internet architecture and analyzes and optionally monitors communication between users or computers and other users or computers on the Internet. Monitoring and analyzing are performed upon receipt of communications from a user or his computer, upon receipt from the Internet infrastructure of communications relating to a communication from a user or his computer, or both. In general, the method comprises analyzing a communication from a point of origin on the Internet, and redirecting the communication to a landing page if a pre-defined error condition is encountered and a higher level protocol can be inferred. A suitable Internet appliance is that disclosed in U.S. Patent Application Publication No. 2005/0105513 and published international application PCT/US2005/015381.

The system and method of the invention rely to some extent on the fact that many administrators of computers on the Internet use naming conventions for their hostnames (i.e., computer names). For example, computers that run web servers are often given a name www (for world wide web). Another example is that servers that primarily serve as File Transfer Protocol (FTP) servers are given the hostname of ftp. The complete name of a server is constructed as having a host name plus the domain name appended to it which is then called the Fully Qualified Domain Name (FQDN) and is represented in the following fashion: www-dot-paxfire-dot-com. For the purposes of this document, "FQDN" is used interchangeably with "hostname". This present invention takes advantage of the fact that hostnames follow naming conventions. Using the present system and method, an Internet appliance, such as the Internet appliance provided by Paxfire, Inc. (Herndon, Va.) can be highly discriminating in its selection of specific queries that it redirects to a results server (i.e., landing page server). For example, according to the present invention, the Internet appliance can be configured to redirect only those users that have asked for a hostname that begins with www and whose query results in a DNS error. This would happen when, for example, a user makes a mistake in the spelling of any part of the FQDN and the DNS infrastructure determines that this hostname does not exist.

As discussed above, the method comprises analyzing a communication from a point of origin on the Internet. The point of origin may be a user (through use of his computer), or a computer (running autonomously). Where the point of origin is a computer, the computer can be manually controlled by a user at the time of initiation of the communication, or can be automatically running, without real-time interaction of a user. Thus, a computer can be, for example, a personal computer of a user; a home or business internal server; a hub, switch, or router; or a web or DNS server. In embodiments, the computer is a machine that has been programmed to automatically initiate communications on the Internet (i.e., a "robot"). Accordingly, the communication that is analyzed can originate with a particular user or with a computer on the Internet, whether or not that computer on the Internet is responding to a communication from the user, his computer, or any other computer(s) on the Internet.

The act of analyzing can comprise receiving a communication from a user, through use of his computer. It also can comprise receiving a communication from another computer on the Internet, either as an automated communication or as a communication manually provided by a user of that computer. In embodiments, it comprises receiving a communication from both. As a general matter, analyzing comprises reading at least part of a query, such as at least part or all of the FQDN, and determining if the information read contains one or more pre-defined character sets or bit strings. In preferred embodiments, bit strings are analyzed, although the process is similar for treatment of character sets. The pre-defined bit strings can be any bit strings. Thus, they can be strings that relate to one or more particular web sites or web pages, that relate to particular words or phrases, or that relate to particular common typographical mistakes for one or more web sites. In embodiments, the bit strings contain information relating to or predictive of a higher-level protocol (i.e., a protocol for transmission of information over the Internet, which is not simply an IP Address). Examples of such higher-level protocols include, but are not necessarily limited to, HTTP, HTTPS, SMTP, and FTP. In some embodiments, the information can be the particular higher-level protocol of interest. In other embodiments, the information can be indicative or predictive of the higher level protocol of interest (e.g., "www" is indicative of the desire to use the HTTP protocol).

The method further comprises directing the user, computer, or subscriber to an IP Address specific for a landing page if a pre-defined bit string is encountered. For example, if an error message is returned from the Internet infrastructure, an Internet appliance according to the invention can provide the user who submitted the original (erroneous) query with an IP Address of a results server that can generate a landing page containing content relevant results, typically including advertising content.

The method yet further comprises analyzing a request from a user for a connection to a computer at the IP Address provided. This analysis can be performed by any number of hardware/software combinations, and in embodiments, is performed by a service profiler, a firewall, a load balancer, or a combination of two or all three of these. The request is analyzed for the communication protocol being used, or intended to be used. At this step, only requests containing certain pre-defined communication protocols are permitted to connect to the results server providing the landing page. All other requests result in generation of an appropriate error message, which is returned to the user and/or the application. Communication protocols associated with requests are identified based on character sets or bit strings. The protocols can be any protocols, but are typically higher-level protocols. According to the invention, a single protocol may be targeted for redirection, or two or more protocols may be targeted for redirection. Communications associated with all other, non-target protocols will not be redirected. For example, to improve the efficiency of advertisement placement on landing pages created in response to malformed queries, the systems and methods of the invention can be employed. In doing so, the methods can identify all Internet traffic that is not associated with the HTTP protocol, and mark it as traffic that is not to be directed to a redirect landing page. In this way, only traffic that is associated with the HTTP protocol, which is highly likely to be requests for information that is relevant to products or services offered by merchants and is being initiated by a human user (vs. an automated program running without human interaction), will be redirected to a landing page if certain criteria are met (e.g., other character sets or bit strings are encountered). Landing pages are not created in response to communications associated with higher-level protocols other than HTTP, such as e-mails (SMTP traffic). Instead, appropriate responses are returned to the user (e.g., a response code is sent to the initiating mail server, informing it that the requested service (an e-mail connection) is not available). In essence, an Internet appliance is programmed to recognize communications associated with the various available higher-level protocols, and sort among those protocols to either provide redirection services or not to provide redirection services. The various "yes" or "no" states for each protocol can be defined by each entity implementing the systems and methods of the invention, and can be altered over time to suit the needs and desires of the entity.

Analysis of whether to redirect at the appliance level can be based on a combination of multiple types of information in IP communications, such as, for example, the frequency, amount, and content of DNS requests generated by an IP address. For example, a mail server that serves a large number of business users will perform a large number of DNS requests for MX records from many domains during the business day. In this instance, the Internet appliance may determine that this IP address is a mail server and will dynamically modify its configuration to never redirect that IP address.

Analysis can also be done on the traffic redirected to the landing page location. The landing page location receives more information than the Internet appliance to determine the actual higher layer protocol desired. For originating UDP and TCP traffic, the port number is received, which usually indicates the application in use. If the request is HTTP, the landing page server also receives the whole URL. With this additional information, the landing page location can process both HTTP and non-HTTP traffic for the purpose of creating data that can be pushed back to the Internet appliance to make it more accurate in its operation. This feed-back loop provides certain advantages, as indicated herein, for embodiments of the systems and methods of the invention.

In preferred embodiments, the method further comprises communicating to the Internet appliance the computer IP Addresses of computers that have made requests that include one or more pre-defined bit strings or character sets that are not of interest to the entity implementing the system and method of the invention. For example, if an entity implementing the invention is interested in providing landing pages for only those request that are associated with the HTTP protocol, the IP Addresses of all requesters attempting to connect to the landing page using FTP or SMTP protocols will be communicated to the Internet appliance. In this way, the Internet appliance can dynamically "learn" IP Addresses and hostnames/domain names that are typically associated with protocols that are not of interest to the entity implementing the present system, and not analyze or redirect communications from and to that IP Address or hostname/domain name.

Typically, the communicating is initiated by the component of the system (e.g. processor, computer) that performed the analysis for higher-level protocol. For example, it can be a service profiler, a firewall, a load balancer, or a combination of two or more of these.

The method of the invention can further comprise monitoring communication traffic. Monitoring comprises detecting communication or an attempted communication between a user, a computer, or a subscriber and one or more computers on the Internet, and vice versa. In general, monitoring involves receiving information relating to the point of origin of a communication and about the computer or IP address of a computer to which the user or computer at the point of origin desires to contact. Monitoring thus can be an activity that is part of analysis. Monitoring may also be part of an ancillary procedure for identifying particular users, computers, or subscribers (typically by way of an IP Address) that show a particular type of activity. For example, monitoring can be used to identify IP Addresses that repeatedly initiate certain types of communication sessions or repeatedly request invalid hostnames. Monitoring can occur at the time of initial communication between the computer at the point of origin and another computer. In embodiments, monitoring can continue throughout the communication session. It can also occur at two or more short, discrete intervals during the communication session.

At its basic level, an Internet appliance according to the present invention provides an automated system and method for analyzing communication traffic between a user or computer at a point of origin and another computer on the Internet. It is particularly well suited for analysis of communications containing unresolvable, unwanted, or erroneous queries. By analyzing this information, the Internet appliance of the invention can determine if an unresolvable, unwanted, or erroneous query was submitted by a user, computer, or subscriber, or if an error message was returned to the user, computer, or subscriber in response to the query. This information is used to decide whether to redirect a particular user/computer/subscriber to a redirect landing page. One or more other components of the system then provide further refinement of the redirect system by analyzing the communication protocol to be used in the communication, and either passing the communication on to the landing page (when the appropriate protocol is used) or returning the communication with an appropriate error message.

Methods and systems for analyzing and redirecting communication traffic are known in the art, and any suitable method and/or system can be used. Preferably, a method and/or system as disclosed in U.S. Patent Application Publication No. 2005/0105513 or published international application PCT/US2005/015381, including an Internet appliance disclosed therein, is used.

In addition to the Internet appliance, the system of the invention can comprise one or more other processors or computers. In a preferred embodiment, the system further comprises a processor that creates a landing page for redirected communications. As used herein, this processor is variously referred to as a landing page server and a results server. The results server creates, preferably dynamically, landing pages that contain information, preferably content-relevant information, based on the original communication(s). The landing page, in embodiments, contains advertisements, search results, a search bar, other information, or a combination of two or more of these.

The system may further comprise one or more other processors, which may be used in a secondary level of control of certain communications. One such processor is referred to generally in this document as a firewall or load balancer. It is understood that in the art these two terms are often used to denote two different processors/pieces of hardware within a system. For ease of reference, as used herein, the terms are used interchangeably to denote one or both of these types of hardware and the software contained on them. In addition to the typical functions performed by the firewall or load balancer, it may function according to the present invention to further screen for desirable communication traffic for redirection. The firewall or load balancer can be configured to analyze redirected traffic from the Internet appliance, to identify traffic that has been redirected, but that does not truly qualify as traffic of interest to the entity controlling the system.

For example, the Internet appliance can be configured to analyze all traffic passing through an ISP, identify traffic of interest (e.g., unresolvable queries or queries for a hostname of a particular web site), and redirect that traffic to a results server for display of a landing page containing content-relevant information, including advertisements, if a pre-defined bit string is communicated by a user in a query or from the Internet infrastructure in response to the query. In certain embodiments, the pre-defined bit string can be one that is indicative or predictive of a particular communication protocol (e.g., HTTP). The Internet appliance might identify such traffic by recognition of a "www" character string (or bit string representing these characters) within the FQDN. The query or response would be redirected to the results server by the Internet appliance by supplying the IP Address of the results server to the user's browser. However, the network device (e.g., firewall or load balancer) could be interposed between the user and the results server, and it will look at the protocol content to determine if this is port 80 (HTTP) traffic. If the port number is 80, the user would be directed to the results server. Any other port number would cause the firewall to direct the user to a processor referred to herein as a service profiler, which would provide an alternative result, such as a message that the user has provided an invalid hostname or reached an invalid destination, and should confirm the hostname and protocol desired or another protocol-appropriate response (e.g., TCP reset). In certain embodiments, the service profiler provides the analysis function.

As another example, redirection may be based, at least in part, on determination of the Session Initiation Protocol (SIP). A user desiring to make a SIP voice call to another could accidentally type in the wrong hostname they desire to reach—for example, user-at-sip-dot-nonexistentdomain-dot-com. When a DNS query is initiated by the user, the Internet appliance detects the DNS NXDOMAIN response and inspects the hostname desired. Upon seeing that it starts with "sip", the appliance assumes the SIP protocol and voice communication is desired. The Internet appliance could then redirect the user to the equivalent of an Internet based directory service application (the equivalent of 411 in the telephony network) to help the user find the desired destination.

Another non-limiting example of redirection is the redirection of email error traffic. In such a scenario, a user could make a mistake in addressing an email message such as user-at-nonexistentdomain-dot-com. The Internet appliance could redirect that mail server trying to deliver the message to another specialized mail server instead of allowing a DNS error back to the initiating mail server. The initiating mail server then connects to the special mail server and exchanges data, on piece of which is the initiating user's email address. After communication between the servers has ended, the specialized email server could initiate an email to the user which contained any type of information.

Another non-limiting example is one relating to redirecting valid hostnames (non error) that use the HTTP protocol, and can be understood in the context of an anti-phishing protection service. In this scenario, an offline system compiles a list of host/domain names of phishing sites and propagates that list to an Internet appliance. When the appliance detects a DNS query in that list, it can redirect the user to a special landing page. This page can analyze the requested URL and decide whether to block the request, warn the user that they may be attempting to connect to a phishing site, or let the request proceed.

As should be evident, another processor that may be included in the system of the invention is referred to generally in this document as a service profiler. The main, but not necessarily sole, purpose of the service profiler is to provide information to users, computers, and subscribers that queries they have submitted to the Internet infrastructure do not correspond to a valid destination or contain inconsistent hostname/protocol indications. Where the service profiler is the component that provides an analysis function, the service profiler can also route requests for connections to the requested landing page either to the landing page or to another landing page, which can contain a response to the query that informs the user that the query was improper. In embodiments, the service profiler is a separate processor from one, some, or all of the other processors of the system. In other embodiments, the service profiler is the same processor, or contained on the same piece of hardware, as one or more other processors of the system.

A second purpose of the service profiler is to record attempts by users, computers, and/or subscribers to use a protocol not supported by a particular computer at a hostname. This can be accomplished by recording the IP Address, port number, and date/time of the communication. This information can be communicated to the Internet appliance of the system. The Internet appliance can then log the IP Address, date/time, and hostname of every DNS response it redirects as well. Using the IP Address and date/time from the service profiler, the Internet appliance can determine the hostname to which an attempt was made to connect using a different protocol (i.e., a protocol that did not match the protocol supported by the hostname computer), and keep track for that hostname of the number of times the hostname resulted in a redirect even though the proper protocol was not used. The information recorded can be maintained in a flat file, a database, or the like.

With the feedback from the service profiler, the Internet appliance can dynamically modify its rules for determining whether to redirect a specific DNS message or not. For example, if there was a host called ops-dot-paxfire-dot-com that was an FTP server, but a user misspelled the domain name so that the host on which a DNS lookup was performed was ops-dot-paxfires-dot-com (which doesn't exist), the Internet appliance could keep track of that specific host name and even though a DNS error was encountered, it could decide not to redirect the requesting computer to the results server because it has "learned" via feedback that this host is a FTP server and not a HTTP server. In view of the fact that the methods of conducting business disclosed herein and known in the art can generate revenue from redirection of certain types of traffic, and in particular high levels of revenue from HTTP traffic, it can be advantageous if the Internet appliance did not redirect DNS queries for this hostname to the results server.

Of course, the system may further comprise any number of other processors, computers, servers, etc. to provide additional services or redundancy. For example, it can comprise one or more firewalls, one or more load balancers, one or more back-up servers, and the like. The number and identity of these additional pieces of hardware, and the type of software running on them can be selected with ease by those of skill in the art based on the particular needs or desires at the time.

Among the many advantages provided by embodiments of the present system and method, in some embodiments, they provide the ability to determine if an automated query system (e.g., a robot) is searching or attempting to connect to a particular computer. Determining can be based on any number of factors, including the robot using an invalid hostname or inconsistent hostname and protocol. Other non-limiting examples include identifying use of valid hostnames (which have been pre-defined as names for redirection) or combinations of valid and invalid hostnames which are either repeatedly requested or requested at a high frequency (e.g., the same hostname repeatedly requested in a short period of time, or multiple invalid hostnames requested in a short period of time). As a general matter, determination of queries initiated by robots can be based on any number of factors, but is often based on the frequency of requests made and the frequency of variations in hostnames requested. That is, the system and method of the invention can be designed to identify frequencies of requests that are too high for a human to possibly have manually made, at which point an assumption or conclusion is made that the requests from that particular IP address are being made by a robot. Redirection of requests from those IP addresses is "learned" to be of little value, and once that determination is made, the systems and methods do not redirect from that IP address. Optionally and preferably, such searches and attempts are not subjected to redirection.

The system and method also provide, in embodiments, the ability to filter communications at the Internet appliance of the invention. In essence, the Internet appliance can perform "hostname analysis" by looking at communications for bit strings or character sets indicative of higher-level protocols that are not of interest to the entity using the system and method, and taking no action on those communications. Furthermore, in embodiments, the efficiency of a redirection system can be improved by the present system and method by providing an Internet appliance with a set of definitions, which may be updated and which may be supplied by a service profiler, identifying hostnames or other character sets or bit strings that should or, more preferably, should not be subjected to redirection. Rules can be applied at the Internet appliance and/or service profiler to create one or more lists at the Internet appliance to determine what traffic is to be subjected to redirection and what traffic is not. In embodiments, the rules relate to redirection of HTTP traffic only.

As should be evident, the present invention provides a computer system for redirecting Internet communications, where the system comprises: a processor that receives information from a computer at a point of origin; optionally, a processor that analyzes the information for one or more pre-defined bit strings or character sets; a processor that receives return information from a computer that communicates with other computers on the Internet; a processor that analyzes the return information for said one or more pre-defined bit strings or character sets; optionally, a processor that a) supplies one or more IP Addresses for the information requested if one or more of the pre-defined bit strings or character sets are not encountered, b) supplies one or more second IP Addresses for the information requested if one or more different bit strings or character sets are encountered, c) supplies one or more third IP Addresses if one or more of the pre-defined bit strings or character sets are encountered and a higher level protocol can be inferred, and/or d) allows the traffic to flow thru unmodified; and a processor that analyzes a request submitted to the different IP Address for one or more alternative bit strings or character sets, wherein the alternative bit strings or character sets are indicative of a particular higher level Internet communication protocol. While not necessarily limited as such, typically the high-level Internet protocol is HTTP, HTTPS, SMTP, FTP, SSH, Telnet, or other protocol above IP, or two or more of these. In certain situations, the alternative bit strings or character sets relate to a request to communicate via a particular port number. In addition, in embodiments, the information from a computer at a point of origin is a DNS query and the pre-defined bit strings or character sets relate to a hostname. Of course, in embodiments, the system can comprise the computer at the point of origin. Looking specifically at processors, in embodiments, the system can comprise a processor that receives a request to connect to a computer at the IP Address, a processor that analyzes the request for pre-defined bit strings or character sets that are indicative of a particular Internet communication protocol, or both (including situations where they are the same processor). In certain embodiments, the system comprises a processor at the IP Address, where the processor generates a landing page containing information that is relevant to the content of the information sent from the point of origin. Of course, the system can comprise a processor at the different IP Address.

Many variations and additional optional features may be included in the system of the invention. For example, the system may comprise maintaining a list of bit strings or character sets for which a different IP Address should not be supplied, for example wherein items for the list are generated by the processor that analyzes a request submitted to said different IP Address. The list can be maintained by a processor that transparently passes DNS responses if one or more conditions or pre-defined bit strings or character sets are not encountered, and that supplies a different IP Address if one or more of the conditions or pre-defined bit strings or character sets are encountered. The system can also comprise updating the list at one or more times after creation of the list. For example, the list can be updated based on monitoring of requests for: originating IP Address, requested hostname, size of a DNS query, frequency of a single hostname or domain name, port number, date, and/or time, among other things. In embodiments, a list is maintained on a computer that analyzes one or more requests submitted to the different IP Address and a list is maintained on a computer that analyzes the request(s) submitted to the different IP Address, where the two lists are compared to identify entries in common or not in common. In some embodiments, a list is maintained on a webserver, and at least two lists are compared to identify entries in common or not in common. The system can be used for analysis and monitoring of Internet traffic and can be operated to optimize it for various parameters of the user's choosing. The system can also be operated to build an effective set of rules for redirection of Internet traffic.

In yet another aspect, the invention provides a system and method, which include an Internet appliance, for conducting business over a communications system. Accordingly, the invention provides a method of conducting business using computers. The systems and methods include analyzing communications over the Internet and redirected some communications to a landing page that contains, possibly among other things, advertisements. Various exemplary business purposes are described in U.S. published patent applications 2005/0105513 and 2005/0027882, which are incorporated herein by reference, and any of those are suitable business methods according to the present invention.

The method of doing business can comprise directing communication traffic to a suitable application server, such as one that can generate a landing page comprising information that is relevant to the original query, and charging a provider of the relevant information a fee for inclusion of the information in the landing page. In embodiments, the method is a method of ad targeting using the Internet. In preferred embodiments, the method is implemented, at least in part, before or at the ISP level of the Internet architecture. The method of doing business using a computer includes methods in which the query comprises one or more character sets or bit strings indicative of a higher-level protocol. The system and method of the invention improve the process of redirecting traffic to landing pages by fine-tuning the type of traffic being redirected, such that only a subset of traffic that would otherwise be redirected, for example based on unresolvable queries, is in fact redirected. This fine-tuning reduces the number of redirections on unwanted traffic of interest, and thus reduces the amount of resources expended by those implementing the system and method, such as ISPs, content providers, advertising content providers, and advertisers.

One facet of the method of doing business includes the ability of an ISP to generate new clients, and thus new business. More specifically, in providing the services made available by the present invention, an ISP can attract new business and new revenue by making it more attractive to a user than another ISP. This activity increases the subscribership of the ISP, and generates increased revenue for the ISP. Furthermore, an ISP or other organization implementing the present invention can sell advertising space on landing pages that it generates. This advertising space represents revenue that is generated by implementing the systems, methods, and appliances of the present invention.

Likewise, the method of doing business includes the ability of a search content provider to increase its revenue. By lessening the resource requirements for search content providers (for example by reducing processing of queries relating to non-human HTTP traffic), the costs of doing business for the search content providers is reduced. Accordingly, capital outlays for hardware and software, recurring charges for service, maintenance, and infrastructure, and costs for electricity are reduced. Furthermore, capital outlays for personnel can be reduced due to the reduced load on the content service provider. In addition, search content providers can generate revenue by implementing or becoming a part of the system and method of the invention.

There are multiple entities that can generate revenue from use of the system and method of the present invention. Initially, advertisers generate revenue through sales of services and products to Internet users who find their advertisements on landing pages generated as a result of the present systems and methods. Advertising content providers generate revenue, typically as a percentage of sales generated by advertisers using the content provider's services, as a result of Internet users making purchases from the advertisers. Entities other than ISPs that implement the system and method of the invention (e.g., a secondary service providers) generate revenue in multiple ways. First, they can generate revenue through charging ISP to use their DNS and/or Internet appliance services. Second, they can generate revenue through fee sharing with the advertisers or advertising content providers, based on users' viewing or clicking of ads as well as purchases of goods or services from advertisers who have advertisements on the redirect landing pages generated by the secondary service provider's systems. In embodiments, the ISP may also generate revenue from use of the present systems and methods. In those embodiments, the ISP can generate revenue through fee sharing with the advertisers, advertising content providers, and/or secondary service providers. Typically, the revenue will be based on users clicking on or viewing ads by ISP customers. In yet further embodiments, the ISP customers may generate revenue through use of the present systems and methods. The customers (users) may obtain cash or monetary credits based on purchase made from advertisers who advertise on landing pages supplied by the secondary service providers, using the present systems and methods.

Other entities that can generate revenue through use of the present systems and methods include search content providers (e.g., search engines), which might provide advertising content as part of a package with search results, or independent of search results. Furthermore, financial institutions, such as banks, may generate revenue as a secondary effect of the methods and systems of the present invention, by way of service fees charged to any one or more of the above-mentioned entities, to transfer money from one account to another, or to maintain an account from which money is to be transferred into and out of.

As should be evident, the present invention provides a method of conducting business using a computer, where the method comprises: analyzing a query submitted from a point of origin or a response to a query returned from the Internet for pre-defined bit strings or character sets indicative of an error state and/or from which a higher level protocol can be inferred; and supplying an IP Address other than that returned from a DNS server in the response if one or more of the pre-defined bit strings or character sets is encountered, wherein the IP Address supplied points to a computer that displays advertisements; and charging advertisers to display advertisements for their products and/or services. The method can also comprise analyzing the query or response for an error state comprises identifying a character set that is indicative of a malformed query, a keyword, a hotword, or a query for unwanted, unresolvable, or impermissible information. In the method, revenue can be provided to advertisers, advertising content providers, entities implementing the system, or a combination of two or more of these. In some embodiments, the method is a method of ad targeting. In the method, advertisers can be charged based on the number of units of goods or services sold through their advertisements.

The systems and methods of the present invention are implemented by way of computers and computer programs. The systems comprise one or more computers comprising integrated circuits for processing of information (e.g., processors). The systems and methods can be, but are not necessarily, implemented without the need to install any new hardware or software into ISP networks, and thus are modular, highly adaptable, and easy and cost-effective to implement. In addition, because the Internet appliance of the invention can be provided partially or entirely as software, it can be implemented and maintained (e.g., updated) rapidly, easily, and inexpensively.

Electronic components and connections used in the Internet appliance and other hardware/software components of the system of the invention are those typically used in the computer industry, as are all other structural elements of the systems. In preferred embodiments, the Internet appliance of the invention is implemented with one or more ISP servers. In these embodiments, the various pieces of hardware, software, and functional units of the Internet appliance and other components can reside on many types of ISP servers, on separate hardware from the ISP servers, or partially on the ISP servers and partially on separate hardware. In certain embodiments, the Internet appliance and other components are provided entirely on separate hardware from the ISP servers. The Internet appliance and other components of the invention and the ISP servers can be physically connected via cables, wires, or the like. The connection can be direct (i.e., from one to the other without any intervening hardware, except via the connector) or indirect (i.e., through one or more other hardware devices, such as circuit boards, filters, etc.). In other embodiments, the connection is not a physical connection (e.g., it is a connection via electromagnetic energy, such as infrared signals, radio signals, microwave signals, optical signals, and the like). In certain embodiments, the Internet appliance is implemented directly within the ISP DNS server (e.g., by insertion of a circuit board into the server). In other embodiments, certain functionalities are implemented directly within the ISP server(s), while other functionalities are implemented one or more other physical components, which are connected, either physically or non-physically.

One advantageous aspect of certain architectural configurations of the present Internet appliance derives from the fact that the Internet appliance and other components are general purpose software engines. As such, they can run software modules other than those of the present invention to deliver other services at this infrastructure layer. In addition, it is to be noted that the system is not limited in the number of pieces or location of hardware that are depicted and/or discussed in exemplary embodiments, and that other hardware and software may be included in different embodiments, such hardware and software being implemented for various functions typically performed by computers and Internet trafficking servers.

It is important to note that the Internet appliance and other components, while being implemented through hardware and software, are made up of functional elements. Thus, each functional unit may exist on a single or multiple different pieces of hardware. Furthermore, each functional unit may be resident on a single or multiple different pieces of hardware, located in the same geographical area or in widely dispersed geographical areas. It is well within the skill of those of skill in the art to implement different functions on different pieces of hardware, which are either directly connected or connected through one or more intervening pieces of hardware. Likewise, although software to control different functionalities that are located on different pieces of hardware, or that exist as multiple copies within the system is part of the present invention, other software that can be implemented to further control certain aspects of the methods and systems, which can be implemented by the operator of the invention based on various desires, can be integrated into the present invention without undue or excessive experimentation by one of skill in the art.

Thus, in embodiments, the system of the invention comprises at least one processor that receives communication information from a user, computer, or subscriber; optionally analyzes the information for one or more pre-defined bit strings or character sets; passes the information to a DNS server; receives return information from the DNS server; analyzes the return information; and either returns the return information to the user, computer, or subscriber, or returns to the user, computer, or subscriber an IP Address for a redirect landing page. The system can further comprise at least one processor that functions as a firewall, load balancer, and/or service profiler, and which analyzes redirect requests supplied by the first processor via the user. The second processor receives from the user, computer, or subscriber a request to connect to an IP Address; analyzes the request for information relating to port access; and either forwards the request to the computer at the requested IP Address or gracefully terminates the connection. The requested IP Address typically provides a landing page containing content relevant information, including advertising, whereas the alternative IP Address typically contains a "notice" that the original communication contained an error.

As used herein, a processor is any hardware, software, or combination of two or more of either or both that can process information within the framework of a computer system. Examples of processors include, but are not necessarily limited to, central processing units (CPU), circuit boards, chips, software, and the like. Where multiple processors are used, they can be connected in serial or parallel. That is, the multiple processors can perform their assigned functions, whether it be a function provided solely by the processor or a function that is redundant to or shared by other processors, at the same time other processors are performing their assigned functions, or one or more processor can act only after one or more other processor has completed its function.

As is evident from the above disclosure, multiple pieces of hardware and combinations of hardware and software can be used to implement the system of the present invention. Thus, in embodiments, the system can comprise means for receiving a request for information from the Internet infrastructure; optional means for analyzing the request for pre-defined bit strings or character sets; means for transmitting the request to the Internet infrastructure, for example by way of a DNS server; means for receiving return information from the Internet infrastructure, for example by way of a DNS server; means for analyzing the return information for pre-defined bit strings or character sets; and means for returning to the submitter of the request an IP Address that is different from that requested. In embodiments, the system further comprises means for receiving a request for the different IP Address; means for analyzing the request for the different IP Address for pre-defined bit strings or character sets indicative of a particular Internet protocol, and in particular, for HTTP communications via port 80; and means for passing the request to the indicated IP Address or gracefully terminating the connection request.

Furthermore, it should be evident that the present invention comprises computers, hard drives, memory chips, memory sticks, CDs, DVDs, tapes, and other devices and articles of manufacture that can be used to store computer programs to perform the various functions of the system and methods of the present invention. Those of skill in the art are well aware of the numerous types of hardware and the numerous types of software code, and combinations of the two, that can effect the functions described herein. Accordingly, they need not be detailed here.

In embodiments, the invention comprises an article of manufacture for use as a computer program transmission apparatus. The article of manufacture comprises: at least one device comprising a substrate capable of storing electronic information that enables a computer to perform at least one function (e.g., a computer disk, removable or stationary), wherein the function comprises a process for analyzing communication traffic between a computer at a point of origin and a server on the Internet, and wherein the process comprises: receiving a request for information from a point of origin; optionally analyzing the information for pre-defined bit strings or character sets; receiving return information from the Internet; analyzing the return information for pre-defined bit strings or character sets; forwarding to the point of origin either the requested information or an IP Address specific for a redirection landing page. Alternatively or additionally, the article of manufacture comprises: at least one device comprising a substrate capable of storing electronic information that enables a computer to perform at least one function (e.g., a computer disk, removable or stationary), wherein the function comprises a process for analyzing communication traffic between a first computer at a point of origin and a second computer at a different point of origin, and wherein the process comprises: receiving a communication containing a request to connect to a particular IP Address from the first computer; analyzing the communication for one or more bit strings or character sets that are indicative of a particular Internet protocol, such as HTTP, including but not limited to a port number such as port number 80; either forwarding the communication to the requested IP Address if one or more of the pre-defined bit strings or character sets are found or gracefully terminate the connection request. In some embodiments, the article of manufacture is a program storage device readable by machine, tangibly embodying a program of instructions executable by the machine. The article of manufacture can, in some embodiments, comprise at least one computer hard drive and/or at least one random access memory chip.

Turning now to the FIGURE, which depicts one exemplary embodiment of the invention, it is shown that an Internet appliance is integrated into an Internet communication pathway at the level of the ISP. In practice, a user submits a query to the Internet infrastructure by way of his browser, resident on his computer. The Internet appliance receives the query and either analyzes it for one or more pre-defined bit strings or character sets, or passes it through to the DNS server without analysis. The DNS server analyzes the hostname of the query and if it does not have the answer in its cache, submits it to the Internet infrastructure for name resolution. Upon return of results for the IP Address request, the Internet appliance analyzes the results for one or more pre-defined bit strings or character sets, such as for an error notice or a particular host/domain name. If the results do not match pre-defined bit strings, the results are forwarded on to the user, and a normal connection is made. If, on the other hand, the query or results contain one or more pre-defined bit strings, the user is redirected to an IP Address pointing to a computer that can generate a landing page containing information, including advertising information. The user, through his browser, then attempts to connect to the computer at the redirect landing page IP Address (i.e., a results server).

The attempted connection is intercepted by a network device (firewall/load balancer/router or like device) interposed between the user and the results server. The network device analyzes the request for the presence of a TCP or UDP packet indicating a port number. If the port number is anything but 80, the redirect request is shunted to an IP Address specific for a service profiler, which then returns an error message to the application (or user) to gracefully inform it that the desired destination is invalid. On the other hand, if the requested port number is 80, the firewall passes the redirect request to a results server, which provides a landing page that contains content-relevant information.

The network device collects information regarding attempted connections to the landing page, processes the information to create a feedback loop of data to the Internet appliance. In particular, it forwards data regarding IP addresses and host/domain names where the attempts are associated with undesired communications (e.g., an attempt to use the FTP protocol or an errant application that uses HTTP). The Internet appliance then integrates the information into one or more databases and/or lists to enable it to better analyze communications upon receipt from users, and permit certain communications to pass through without redirection, even if those communications contain bit strings that are otherwise pre-defined as bit strings of interest. For example, based on information provided by the network device or PSP, the Internet appliance can know that requests originating from a particular IP Address are typically associated with the FTP protocol. The Internet appliance, when it next receives a communication from that IP Address, will mark the communication as one not to analyze or redirect, regardless of the fact that it might contain one or more pre-defined bit strings. In this way, the Internet appliance can "learn" not to send unwanted traffic to the landing page, even if the traffic would otherwise appear to be suitable for redirection.

In certain systems for redirecting communications, all communications that involve an error message from the Internet infrastructure are redirected to a landing page. In the system depicted in FIG. 1, when an error message is encountered as a result of an Internet query, only selected traffic is redirected to a redirect landing page. That is, the system depicted in FIG. 1 is configured to not redirect all traffic containing error messages, but to only redirect that traffic that contains bit strings of interest and is assumed or learned to be associated with the HTTP protocol. The system limits the number of redirections to actual landing pages by analyzing different elements of the communication such as host/domain name, IP address port number, frequency and amount of requests, before a redirection is initiated. A landing page is created only when DNS queries are encountered that are estimated as being HTTP requests and containing pre-defined bit strings of interest. Thus resources of the results server, search content providers, ad content providers, and advertisers are used only when confirmed relevant queries are encountered. Of course, the pre-defined bit strings and protocols can be varied according to the desires of those implementing the system, and the combination of error messages and HTTP requests is used in the FIGURE solely for illustrative purposes.

In embodiments, the Internet appliance is loaded with lists of character sets or bit strings that are pre-defined as either requiring redirection (as in the case of, for example, a request having a known error) or as requiring no redirection (as in the case of, for example, a request coming from an IP Address that typically sends SMTP requests in a system that is designed to redirect only HTTP traffic). In this situation, which is not depicted in FIG. 1, the Internet appliance is able to return to the user, with or without consulting the Internet infrastructure via the DNS server, a redirect IP Address for the results server (in the case where redirection is warranted) or permit communication between the user and Internet without redirection (in the case where redirection would otherwise occur if the Internet appliance did not "know" that the requesting IP Address is typically associated with a communication protocol that is not of interest). As such, this embodiment can improve the speed with which redirection occurs.

One non-limiting example of implementation of the system and method of the invention is as follows. When a user at a browser types in a non-existent domain name and the DNS server he uses has an Internet appliance of the invention between the user and the DNS server, the Internet appliance intercepts the DNS error message stating the domain doesn't exist, and converts the error message to a normal DNS response pointing to a landing page. The user's personal computer then initiates an HTTP connection to the landing page generated by the system. One piece of information that the web browser sends to the landing page (a webserver) is the hostname that it has been informed that it is connecting to.

Because a typical webserver serves pages for more than one domain, a typical webserver looks at the hostname parameter to determine which domain name the user would like to get web pages from. A webserver used in accordance with this embodiment of the present invention is configured differently than the typical webserver. The webserver according to this embodiment of the invention answers any HTTP request, regardless of hostname that the browser sends to the webserver (landing page). In doing so, it analyzes the request, and if it contains information of interest (variously defined by different users), an HTTP redirect message that contains as a parameter the original URL that had been requested. The redirect message tells the user's browser to reconnect back to a webserver of the system, but to use a standard hostname instead of the one initially used. In this way, the user's web browser will deliver a cookie for the correct specific domain because it is connecting to the domain that it expects to connect to. The present system, in embodiments, uses cookies to determine if the user opted out of one or more services provided by the system and method. In essence, every time a user connects to the standard hostname (e.g., somedomain.com), if a cookie is set for that domain in the user's browser, it will be sent as part of the HTTP request constructed by the browser. So, the present system, in embodiments, is unique in that it accepts all incoming HTTP requests, and redirects the user to come back to a standard host/domain name, deliver a cookie, and the original URL they were looking for. In this way, the system can process the original request.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. For example, the principles of the invention in their broader aspects may be applied to other network systems such as for telephony. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A computer system for redirecting Internet communications, said system comprising:
   a first processor that receives information from a computer at a point of origin;
   a second processor that analyzes the information for one or more pre-defined bit strings or character sets;
   a third processor that receives return information from a computer that communicates with other computers on the Internet;
   a fourth processor that analyzes the return information for said one or more pre-defined bit strings or character sets;
   a fifth processor that
      a) supplies one or more IP Addresses for the information requested if one or more of the pre-defined bit strings or character sets are not encountered,
      b) supplies one or more second IP Addresses for the information requested if one or more different bit strings or character sets are encountered,
      c) supplies one or more third IP Addresses if one or more of the pre-defined bit strings or character sets are encountered and a higher level protocol can be inferred, and/or
      d) allows the traffic to flow thru unmodified; and
   a sixth processor that analyzes a request submitted to said different IP Address for one or more alternative bit strings or character sets,
   wherein the alternative bit strings or character sets are indicative of a particular higher level Internet communication protocol, and
   wherein the system further comprises maintaining a list of bit strings or character sets for which a different IP Address should not be supplied, wherein the list is updated one or more times after creation of the list, and wherein the list is updated based on monitoring of requests for: originating IP Address, requested hostname, size of a DNS query, frequency of a single hostname or domain name, port number, date, and/or time.

2. The system of claim 1, wherein the higher-level Protocol is HTTP, HTTPS, SMTP, FTP, SSH, Telnet, or other protocol above IP, or two or more of these.

3. The system of claim 2, wherein the higher-level Protocol is HTTP.

4. The system of claim 1, comprising one processor.

5. The system of claim 1, wherein the alternative bit strings or character sets relate to a request to communicate via a particular port number.

6. The system of claim 1, wherein the information from the computer at a point of origin is a DNS query and the pre-defined bit strings or character sets relate to a hostname.

7. The system of claim 1, further comprising the computer at the point of origin.

8. The system of claim 1, further comprising:
   a seventh processor that receives a request to connect to a computer at said IP Address.

9. The system of claim 8, further comprising:
   an eighth processor that analyzes the request for pre-defined bit strings or character sets that are indicative of a particular Internet communication protocol.

10. The system of claim 9, wherein the particular Internet communication Protocol is HTTP.

11. The system of claim 9, wherein the processor that receives the request and the processor that analyzes the request are the same processor.

12. The system of claim 9, further comprising:
   a ninth processor at the IP Address,
   wherein the ninth processor generates a landing page containing information that is relevant to the content of the information sent from the point of origin.

13. The system of claim 12, further comprising:
   a tenth processor at the different IP Address.

14. The system of claim 1, wherein the higher level protocol can be inferred from the IP Address of the computer at the point of origin.

15. The system of claim 1, wherein items for the list are generated by the sixth processor that analyzes a request submitted to said different IP Address.

16. The system of claim 1, wherein the list is maintained by an eleventh processor that transparently passes DNS responses if one or more conditions or pre-defined bit strings or character sets are not encountered, and that supplies a different IP Address if one or more of the conditions or pre-defined bit strings or character sets are encountered.

17. The system of claim 1, wherein a list is maintained on a computer that analyzes said request submitted to said different IP Address and a list is maintained on a computer that analyzes said request submitted to said different IP Address, and wherein the two lists are compared to identify entries in common or not in common.

18. The system of claim 17, wherein a list is maintained on a webserver, and wherein at least two lists are compared to identify entries in common or not in common.

19. The system of claim 1, wherein the system is used for analysis and monitoring of Internet traffic.

20. The system of claim 1, wherein the system is operated to optimize it for various parameters.

21. The system of claim 1, wherein the system is operated to build an effective set of rules for redirection of Internet traffic.

* * * * *